(12) United States Patent
Skowronek et al.

(10) Patent No.: US 7,718,881 B2
(45) Date of Patent: May 18, 2010

(54) METHOD AND ELECTRONIC DEVICE FOR DETERMINING A CHARACTERISTIC OF A CONTENT ITEM

(75) Inventors: Janto Skowronek, Eindhoven (NL); Martin Franciscus McKinney, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 11/916,305

(22) PCT Filed: May 30, 2006

(86) PCT No.: PCT/IB2006/051719

§ 371 (c)(1),
(2), (4) Date: Dec. 3, 2007

(87) PCT Pub. No.: WO2006/129274

PCT Pub. Date: Dec. 7, 2006

(65) Prior Publication Data

US 2008/0202320 A1      Aug. 28, 2008

(30) Foreign Application Priority Data

Jun. 1, 2005   (EP)   .................... 05104740

(51) Int. Cl.
*G10H 1/00* (2006.01)
(52) U.S. Cl. ............... 84/600; 84/602; 700/94
(58) Field of Classification Search ........... 84/600–602; 700/94
See application file for complete search history.

(56) References Cited

U.S. PATENT DOCUMENTS

| 5,918,223 | A | 6/1999 | Blum et al. | |
| 6,201,176 | B1 * | 3/2001 | Yourlo | 84/609 |
| 6,426,456 | B1 * | 7/2002 | Khawand et al. | 84/624 |

(Continued)

FOREIGN PATENT DOCUMENTS

EP         0955592  A2    11/1999

(Continued)

OTHER PUBLICATIONS

Perfecto Herrera, et al: Percussion-Related Semantic Descriptors of Music Audio Files, AES 25th International Conf. Jun. 17-19, 2004, pp. 1-5, XP002397754.

(Continued)

*Primary Examiner*—David S. Warren

(57) ABSTRACT

The method of determining a characteristic of a content item comprises the steps of selecting (1) data representative of a plurality of sounds from the content item, determining (3) a characteristic of each of the plurality of sounds by analyzing said data, each characteristic representing a temporal aspect of an amplitude of one of the plurality of sounds, and determining (5) the characteristic of the content item based on the plurality of determined characteristics. The characteristic of the content item and/or a genre and/or mood based on the characteristic of the content item may be associated with the content item as an attribute value. If the content item is part of a collection of content items, the attribute value can be used in a method of searching for a content item in the collection of content items. The electronic device of the invention comprises electronic circuitry. The electronic circuitry is operative to perform one or both methods of the invention.

10 Claims, 4 Drawing Sheets

U.S. PATENT DOCUMENTS

| | | | |
|---|---|---|---|
| 6,469,240 | B2 | 10/2002 | Pachet et al. |
| 6,476,308 | B1 | 11/2002 | Zhang |
| 6,545,209 | B1 * | 4/2003 | Flannery et al. ............... 84/609 |
| 6,987,221 | B2 * | 1/2006 | Platt ........................... 84/601 |
| 7,022,905 | B1 * | 4/2006 | Hinman et al. ................ 84/609 |
| 7,022,907 | B2 * | 4/2006 | Lu et al. ....................... 84/611 |
| 7,035,873 | B2 * | 4/2006 | Weare ....................... 707/104.1 |
| 7,115,808 | B2 * | 10/2006 | Lu et al. ....................... 84/611 |
| 7,196,258 | B2 * | 3/2007 | Platt ........................... 84/600 |
| 7,227,072 | B1 * | 6/2007 | Weare .......................... 84/609 |
| 7,279,629 | B2 * | 10/2007 | Hinman et al. ................ 84/615 |
| 7,295,977 | B2 * | 11/2007 | Whitman et al. ............ 704/236 |
| 7,296,031 | B1 * | 11/2007 | Platt et al. .................... 707/102 |
| 7,313,571 | B1 * | 12/2007 | Platt et al. .................... 707/102 |
| 7,326,848 | B2 * | 2/2008 | Weare et al. .................. 84/668 |
| 7,396,990 | B2 * | 7/2008 | Lu et al. ....................... 84/611 |
| 2002/0134220 | A1 * | 9/2002 | Yamane et al. ................ 84/609 |
| 2003/0089218 | A1 * | 5/2003 | Gang et al. ................... 84/615 |
| 2003/0221541 | A1 * | 12/2003 | Platt ............................ 84/609 |
| 2004/0003706 | A1 * | 1/2004 | Tagawa et al. ................ 84/609 |
| 2004/0060426 | A1 * | 4/2004 | Weare et al. .................. 84/668 |
| 2005/0092165 | A1 * | 5/2005 | Weare et al. .................. 84/668 |
| 2005/0120868 | A1 * | 6/2005 | Hinman et al. ............... 84/615 |
| 2005/0120870 | A1 * | 6/2005 | Ludwig ........................ 84/661 |
| 2006/0032363 | A1 * | 2/2006 | Platt ............................ 84/601 |
| 2006/0064299 | A1 * | 3/2006 | Uhle et al. .................... 704/212 |
| 2006/0075883 | A1 * | 4/2006 | Thorne et al. ................. 84/609 |
| 2006/0075886 | A1 * | 4/2006 | Cremer et al. ................ 84/635 |
| 2006/0096447 | A1 * | 5/2006 | Weare et al. .................. 84/616 |
| 2006/0254409 | A1 * | 11/2006 | Withop ........................ 84/601 |
| 2007/0199430 | A1 * | 8/2007 | Cremer et al. ................ 84/611 |
| 2008/0022844 | A1 * | 1/2008 | Poliner et al. ................. 84/609 |
| 2008/0190267 | A1 * | 8/2008 | Rechsteiner et al. .......... 84/609 |

FOREIGN PATENT DOCUMENTS

WO  2004084186 A1  9/2004

OTHER PUBLICATIONS

Yazhong Feng, et al: Popular Music Retrieval by Detecting Mood, SIGIR Forum, ACM, New York, Jul. 1, 2003, pp. 375-376, XP009040410.

Jean-Julien Aucouturier, et al: Representing Musical Centre: A State of the Art, Journal of New Music Research, Swets & Zeitlinger, vol. 32, No. 1, Mar. 2003, p. 83-93, XP002365108.

Matthias Gruhne, et al: Extraction of Drum Patterns and Their Description within the MPEG-7 High-Level-Framworik, Fraunhofer IDMT, 2004 Universal Pompeu Fabra.

Kristoffer Jensen,: Timbre Models of Musical Sounds, Diku Rapport, Department of Computer Science, University of Copenhagen, 1999, pp. 1-247.

Christian Uhle, et al: Extraction of Drum Tracks From Polyphonic Music Using Independent Subspace Analysis, 4th International Symposium on Independent Component Analysis and Blind Signal Seperation, ICA203, Apr. 2003, Nara, Japan, pp. 843-848.

Aymeric Zils, et al; Automatic Extraction of Drum Tracks From Polyphonic Music Signals, Proceedings of the 2nd InternationalConf. on Web Delivering of Music, Sony CSL—Paris, Dec. 9-11, 2002, pp. 1-5.

J. E. Schrader, Detecting and Interpreting Musical Note Onsets in Polyphonic Music, Master Thesis, Department of Electrical Engineering, TU Eindhoven, Oct. 2003, pp. 1-56.

\* cited by examiner $$Curve(x) = v_0 + (v_1 - v_0)(1 - (1-x)^n)^{1/n} \quad (2.1)$$

$$n = n_{opt} \text{ with } Error \mid n_{opt} = \min\nolimits_{\forall n}(Error\mid n) \quad (2.2)$$

$$Error\mid n = \sum_{x=0}^{1}(Curve(x)\mid n - env(x))^2 \quad (2.3)$$

METHOD AND ELECTRONIC DEVICE FOR DETERMINING A CHARACTERISTIC OF A CONTENT ITEM

The invention relates to a method of determining a characteristic of a content item.

The invention further relates to a method of searching for a content item in a plurality of content items.

The invention also relates to software for making a programmable device operative to perform a method of determining a characteristic of a content item and/or a method of searching for a content item in a plurality of content items.

The invention further relates to an electronic device comprising electronic circuitry, the electronic circuitry being operative to determine a characteristic of a content item.

The invention also relates to an electronic device comprising electronic circuitry, the electronic circuitry being operative to search for a content item in a plurality of content items.

The invention further relates to electronic circuitry for use in an electronic device, the electronic circuitry being operative to determine a characteristic of a content item or to search for a content item in a plurality of content items.

An example of such a method is known from U.S. Pat. No. 5,918,223. The method described in this patent measures a plurality of acoustical features of a sound file chosen from the group consisting of at least one of loudness, pitch, brightness, bandwidth and MFCC coefficients thereof. Measurements computed based on these features are used to group sound files. It is a drawback of this method that its low-level features are not sufficient to allow a user to search and find all songs matching his preferences.

It is a first object of the invention to provide a method of the kind described in the opening paragraph, which determines a characteristic that can be used to search and find more songs matching a user's preferences.

It is a second object of the invention to provide an electronic device of the kind described in the opening paragraph, which is capable of determining a characteristic that can be used to search and find more songs matching a user's preferences.

The first object is according to the invention realized in that the method comprises the steps of selecting data representative of a plurality of sounds from the content item, determining a characteristic of each of the plurality of sounds by analyzing said data, each characteristic representing a temporal aspect of an amplitude of one of the plurality of sounds, and determining the characteristic of the content item based on the plurality of determined characteristics. The method determines a measure of percussiveness of a content item, e.g. an MP3 file, a music video, or an audio track of a movie. The inventors have recognized that consumers cannot only recognize whether an instrument is percussive or not, but that they are also able to recognize a measure of percussiveness for a whole content item. Because the measure of percussiveness is a high-level feature, it well suited to be used to search and find songs matching a user's preferences, instead or in addition to other features like tempo, for example. Furthermore, this measure of percussiveness can be used to find similar music based on a seed song and/or to automatically set parameters of audio dynamics manipulation algorithms like limiters/compressors/volume control.

In an embodiment of the method of the invention, the step of determining the characteristic of the content item comprises determining a percentage. For example, a content item may be 75% percussive and 25% non-percussive, or 50% percussive and non-harmonic, 30% percussive and harmonic and 20% non-percussive. When this percentage is used in search queries, at first, a user may not know the relation between the percussiveness and the content items that have this measure of percussiveness. However, when the user experiments with this search criterion, he will quickly learn this relation.

Alternatively or additionally, the step of determining the characteristic of the content item comprises determining a dominant instrument. A dominant instrument selected by a user can be translated into a percussiveness range, which can be used for searching a content item in a plurality of content items. Although searching for content items which have percussiveness in this range will probably not find all content items with the specified dominant instrument and probably content items with another dominant instrument will also be listed among the found content item, selecting a dominant instrument may be more understandable for users than selecting a percentage.

The method may further comprise the step of determining a genre and/or mood of the content item based on the characteristic of the content item. Experiments have demonstrated that this measure of percussiveness can be used for genre detection with good results when detecting one music genre out of the others and discriminating between two music genres. As the method of determining a mood is similar to the method of determining a genre, this measure of percussiveness is also expected to lead to good results when used for mood detection. Other characteristics of the content item can additionally be used for genre and/or mood detection, but are not required.

The step of determining the characteristic of the content item may comprise determining a first characteristic and a second characteristic of the content item and the step of determining a genre and/or mood of the content item may comprise comparing the first characteristic with a characteristic of a first genre or mood and comparing a second characteristic with a characteristic of a second genre or mood. The measure of percussiveness of a content item can be based on one or more percussiveness features. Some percussiveness features are better suited for detecting a first music genre out of the others or discriminating between the first music genre and a second music genre, while other percussiveness features are better suited for detecting a second genre out of the others or discriminating between the second music genre and a third music genre.

The step of determining a characteristic of each of the plurality of sounds may comprise determining a characteristic of a first phase of each of the plurality of sounds and a characteristic of a second phase of each of the plurality of sounds. Experiments have demonstrated that segmenting a sound into at least an attack phase and one or more other phases, similar to the phases used in synthesizer technology (Attack, Decay, Sustain and Release), and determining percussiveness features for each of the separate phases results in better percussiveness features.

The second object is according to the invention realized in that the electronic device comprises electronic circuitry which is operative to select data representative of a plurality of sounds from the content item, determine a characteristic of each of the plurality of sounds by analyzing said data, each characteristic representing a temporal aspect of an amplitude of one of the plurality of sounds, and determine the characteristic of the content item based on the plurality of determined characteristics.

These and other aspects of the method and electronic device of the invention will be further elucidated and described with reference to the drawings, in which.

Corresponding elements within the drawings are identified by the same reference numeral.

Figure 1:
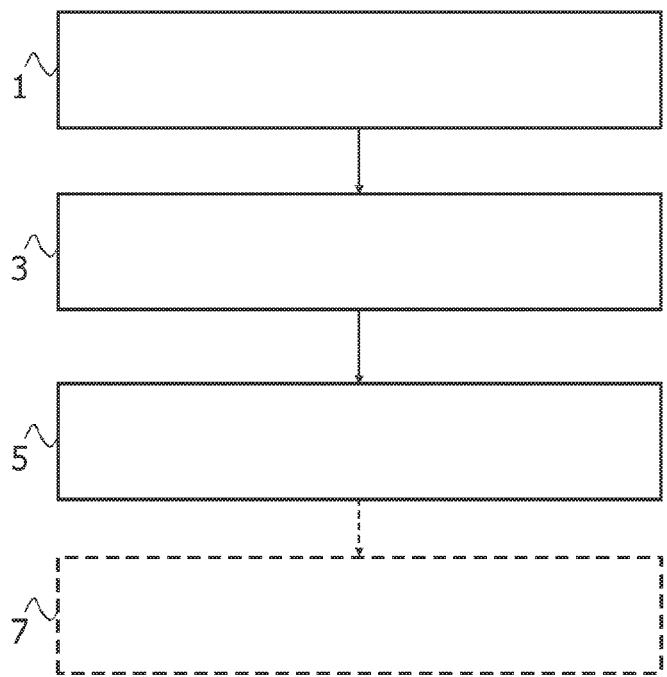
FIG. 1 is a flow diagram of the method of determining a characteristic of a content item.
Figure 2:
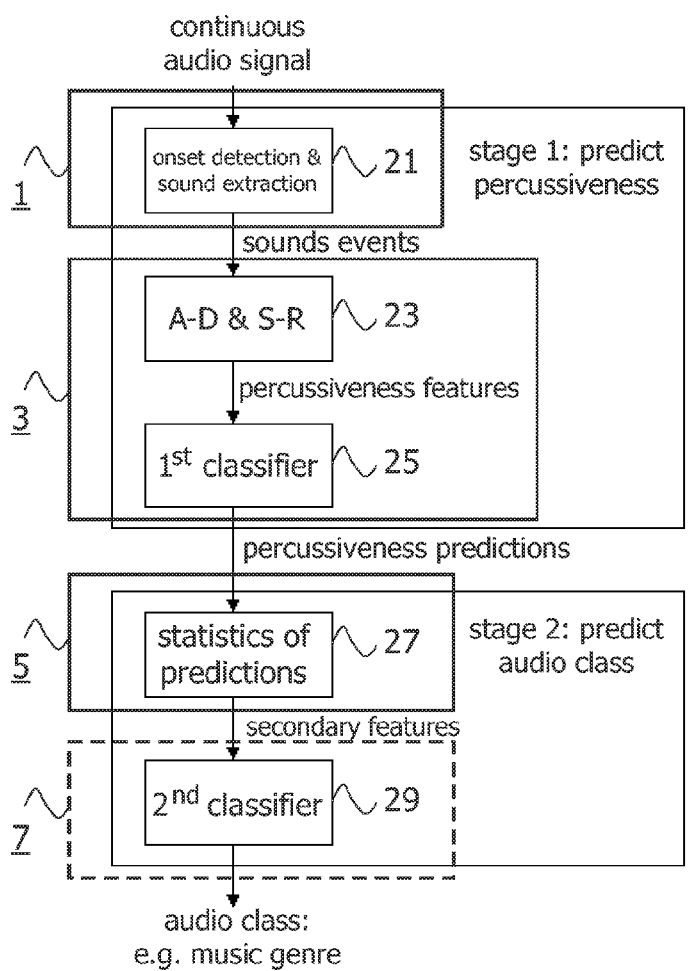
FIG. 2 is a flow diagram of an embodiment of the method of FIG. 1.

Referring to FIGS. 1 and 2, the method of the invention comprises a step 1 of selecting data representative of a plurality of sounds from the content item, a step 3 of determining a characteristic of each of the plurality of sounds by analyzing said data, each characteristic representing a temporal aspect of an amplitude of one of the plurality of sounds, and a step 5 of determining the characteristic of the content item based on the plurality of determined characteristics. The method may further comprise a step 7 of determining a genre and/or mood of the content item based on the characteristic of the content item.

The determined characteristic of the content item and/or the determined genre and/or mood may be associated with the content item as an attribute value. This attribute value may be stored in a playlist, in a file description or in a service provider database, for example. This attribute value may be used in a method of searching for a content item in a plurality of content items, each content item in the plurality of content items being associated with an attribute value. The method finds content items which are associated with an attribute value that is similar to a desired attribute value. The plurality of content items may be part of a larger collection of content items in which some content items are not associated with an attribute value. The method may be performed, for example, by a service provider or a consumer electronic device.

The determined characteristic of the sound is a measure of the timbre of the sound, and in particular a measure of the percussiveness of the sound. A definition for timbre is given by the American National Standardization Institute (ANSI): . . . that attribute of auditory sensation in terms of which a listener can judge that two sounds, similarly presented and having the same loudness and pitch, are different. A common interpretation of this definition is: Timbre helps to distinguish the sounds coming from two types of instruments playing the same note at the same level.

Both the definition and the interpretation point out that it is rather difficult to describe timbre with one single characteristic. There are at least two main activities in timbre research, which confirm this:

1. Perception of timbre: Using perceptual experiments, a number of studies identified those signal properties that contribute to the perception of timbre. Several spectral characteristics like the number and organization of spectral components but also temporal parameters like the attack time are the most important ones.

2. Sound modeling: The parameters specified in the above mentioned studies, are extracted from audio signals and then used for modeling purposes. These models are commonly used either for (re-)synthesizing sounds or for the classification and identification of sounds.

There are several studies where an automatic classification and identification of sounds based on timbre parameters has been done. But most publications deal with the classification of single harmonic or percussive instrument sounds. In addition, there are first attempts, which try to use these approaches for simple multi-timbral phrases. However, the automatic identification of a music instrument in a polyphonic music audio stream is currently unsolved. The reason is that, in polyphonic music, one is confronted with overlapping instruments, and in modern music, also with synthesized or manipulated sounds, which change their timbre during playing. The known timbre features typically refer to single monophonic instruments and are not easily applied to such sounds. That means there is a need for more general features that describe the timbre of arbitrary sound textures without determining the source type (e.g. music instrument) itself. The method of the invention uses the percussiveness of a sound to describe the timbre of the sound. Percussiveness means not necessarily a sound coming from a percussion instrument. It is rather a term used for short sounds having a sharp attack-decay characteristic. The term meaning of the term percussiveness can be illustrated with the following four examples:

1. A flute-sound: One would classify it as a typical non-percussive sound.
2. A snare-drum: One would classify it as a typical percussive sound.
3. A cello playing sustained (the string is excited with a bow): One would classify it as a typical non-percussive sound.
4. The same cello, but this time playing pizzicato (the string is plucked with the fingers): One would agree that the sound is now more percussive than the last one. The reason is that the sound has now a different temporal characteristic, whereas the spectral structure remains basically the same. Signal theory states that time-domain modulations affect the spectrum of a stationary tone. Therefore this sentences means in a way that both signals (sustained and plucked string) have the same underlying organization (e.g. regularity) of spectral components.

Figure 3:
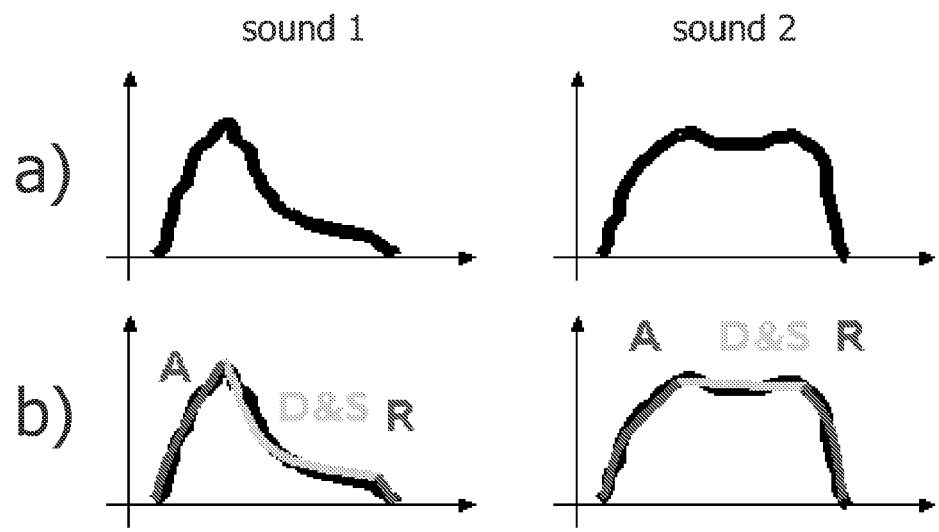
FIG. 3 shows examples of sounds that have been segmented into three phases.

These examples show that percussiveness can be defined as a generalized description for the signal envelope. Thus it is a pure time-domain feature. In this definition, percussiveness refers to the envelope of a sound and the desired features should therefore form a parametric description of that envelope. In an embodiment of the method, first a four-phase approximation of the signal's envelope known from synthesizer technology (Attack, Decay, Sustain and Release) is applied. But for computational reasons it combines the decay and sustain parts of the envelope, leading to three phases Attack (A), Decay&Sustain (D&S) and Release (R). Second, several features are computed, which refer to the time durations, level differences and curve form of these phases. FIG. 3 shows schematically this principle for the envelopes of two different sounds.

The first step of determining the desired A-D&S-R approximation is to determine the phases' start and end points. These time instances can be detected with a method similar to a method proposed by Jensen (*Timbre Models of Musical Sounds*, PhD. Dissertation, Department of Datalogy, University of Copenhagen, DIKU Report 99/7, 1999). The basic idea is a two stage process: first compute a heavily smoothed envelope and determine the desired start and end points; second adjust these points step by step using less and less smoothed versions of the envelope until the unsmoothed case is achieved.

Figure 4:
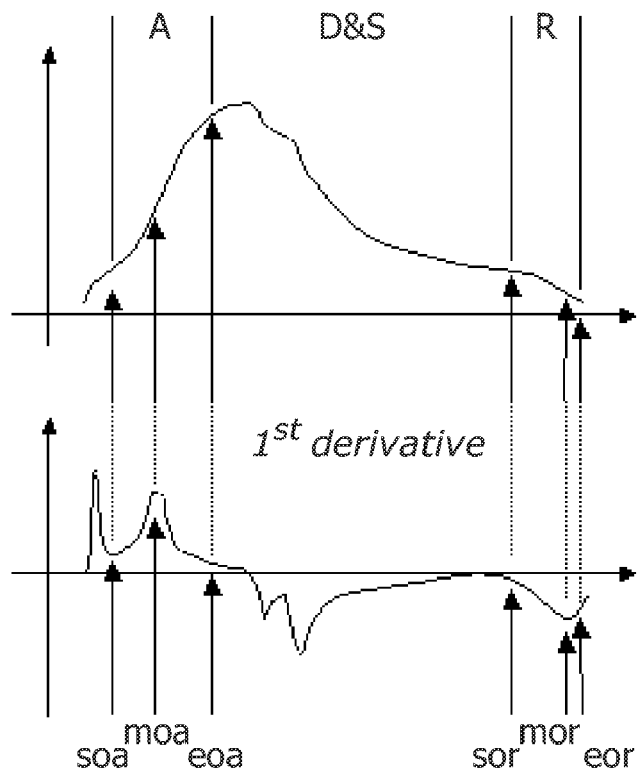
FIG. 4 shows an example of characteristics determined for one of the sounds of FIG. 3.

Jensen's procedure of detecting the time instances of the heavily smoothed envelope has been developed for single harmonic components of a sound. He computed the 1$^{st}$ derivative of the smoothed envelope and used different derivative thresholds in order to find good candidates for the desired start and end points. Jensen showed that this derivative method allows a better detection of the real R-phase for decaying instruments (like pianos) than a more simple method using level thresholds (10% of maximum is the start of attack, 90% is end of attack and so on). However, Jensen's approach needs to be modified in order to work with broadband signals: first the smoothed envelope needs to be derived by computing the absolute values of the signal (both halfwave- and fullwave-rectification can be used) followed by a low pass filtering with a low cutoff frequency. In addition, an extension of the method for detecting the desired time instances is necessary, because the remaining fine structure of the envelope has led to wrong detections. Therefore combinations of thresholds for the 1$^{st}$ derivative and for the envelope itself need to be used (see FIG. 4):

1. Search Time Instances of the A-Phase:

(a) Search 'Middle of Attack' (moa):

'Middle of attack' is that point, where the envelope env(t) has a steep level increase, meaning that the 1$^{st}$ derivative d/dt env(t) has a local maximum, and where the envelope has a reasonable value. The reasonable envelope value is defined by: The last candidate before a local maximum of the envelope is above a certain threshold for the first time: local_max (env(t))$\geq$env crit$_{moa}$=0.25*max(env(t)).

(b) Search Start of Attack (soa):

Starting from moa, go backward until a derivative and an envelope criterion are fulfilled. Derivative condition: d/dt env(t)$\leq$d_crit$_{soa}$=0.1*max(d/dt env(t)). Envelope condition: env(t)$\leq$env_crit$_{soa}$=0.25*max(env(t)).

(c) Search End of Attack (eoa):

Starting from moa, go forward until a derivative and an envelope criterion are fulfilled. Derivative condition: d/dt env(t)$\leq$d_crit$_{eoa}$=0.1*max(d/dt env(t)). Envelope condition: env(t)$\geq$env_crit$_{eoa}$=0.75*max(env(t)).

2. Search Time Instances of the R-Phase:

(a) Search 'Middle of Release' (mor):

'Middle of release' is that point, where the envelope has a steep level decrease, meaning that the 1st derivative has a local minimum below zero, and where the envelope has a reasonable value. The reasonable envelope value is defined by: The first candidate after a local maximum of the envelope was above a certain threshold for the last time: local_max (env(t))$\geq$env_crit$_{mor}$=0.3*max(env(t)).

(b) Search Start of Release (sor):

Starting from mor, go backward until a derivative and an envelope criterion are fulfilled. Derivative condition: d/dt env(t)$\geq$d_crit$_{sor}$=0.2*min (d/dt env(t)). Envelope condition: env(t)$\geq$env_crit$_{sor}$=0.25*max(env(t)).

(c) Search End of Release (eor):

Starting from moa, go forward until a derivative and an envelope criterion are fulfilled. Derivative condition: d/dt env(t)$\geq$d crit$_{eor}$=0.1*max(d/dt env(t)). Envelope condition: env(t)$\leq$env_crit$_{eor}$=0.1*min(env(t)).

3. Define the Time Instances of the D&S-Phase:

Start of D&S is the end of attack (eoa) and end of D&S is the start of release (sor).

Note that the values of the criteria have been found by testing the algorithm with about 40 different instrument sounds. However, using additional test material, other values for the criteria may be found that may lead to an even better detection performance.

In the second step, the adjustment of the found time instances to the unsmoothed case, an iterative procedure is used. Iteration by iteration a less smoothed version of the envelope is computed by using different cutoff frequencies of the low pass filter during the envelope computation (In order to avoid different time delays of the envelopes introduced by the different filters, non-causal filtering is applied that prevents delays caused by the filters). Then the time instances (soa, eoa, sor, eor) are adjusted using a time and a level criterion: The new candidate must not be too far away from the former time instance (|tnew−toldj|$\leq$1024 samples$\approx$23 ms) and its new envelope value not too far from the former envelope value (0.9*env$_{old}$$\leq$env$_{new}$<1.5*env$_{old}$). Again these criteria were derived by testing the algorithm with the above mentioned instrument sounds and other values for the criteria may be found that may lead to an even better detection performance.

Once the above-mentioned start and end points are found, the three-phase approximation of the signal envelope can be applied. In order to find an efficient parametric description of the envelope, the curve form approximation proposed by Jensen is applied for each phase, which can be described with one single parameter n, see equation 2.1 of FIG. 5.

The boundary conditions υ0 and υ1 are the envelope values for the start and end points of the phase. The variable x is the time normalized between zero and one (t=start →x=0, t=end→x=1). The scalar parameter n determines the curve form: If n is equal to 1, then the curve form is linear; if n is smaller than 1, then the curve form has a exponential characteristic; and if n is greater than 1, then the curve form is logarithmic. The optimal curve form parameter n$_{opt}$ is found by minimizing the least-square error between resulting curve form and envelope, see equations 2.2 and 2.3 of FIG. 5.

The result is a three-phase parametric description of the envelope with 11 parameters:
  time instances: soa, eoa, sor, eor
  level values: env(soa), env(eoa), env(sor), env(eor)
  optimal curve form parameters for each phase: nA, nD&S, nR The above described A-D&S-R approximation is designed for calculating a parametric envelope description in one band over the whole frequency range, but this method can be used in a multi-band analysis as well.

In Jensen's approach, the parametric envelope description was computed for single spectral components of the signal. This approach was optimized for his task because he concentrated on (quasi-)harmonic instruments like piano, flute, violin etc. But when confronted also with non-harmonic or mixed harmonic and non-harmonic sounds, a multi-band analysis using broader bands should be applied, where all bands together cover the whole frequency range from 0 to 22050 Hz. For that purpose the algorithm filters the signals with a filter bank (linear-phase FIR filters with ERB-rate scaled bandwidths and approximately rectangular bands) and computes the A-D&S-R parameters for each filter output separately.

The implemented feature extraction algorithm has been tested with single instruments sounds in some preliminary experiments with good results. In order to use the implemented feature extracted algorithm with polyphonic music, the following steps need to be performed:

1. Slice a continuous music or audio stream into pieces starting at occurring onsets and ending at the subsequent onsets.

2. Apply the A-D&S-R approximation and compute the features for estimating percussiveness for each audio piece.

In order to slice continuous audio into useful pieces, the extended algorithm has to detect onsets in the audio stream and then cut around these onsets in such a way that the approximation can work properly. For the onset detection it uses an available method implemented by Schrader (*Detecting and interpreting musical note onsets in polyphonic music*, masters thesis, department of electrical engineering, TU Eindhoven, 2003), which provides the time instances of onsets. Since the detected time instances are quite often pointing more at the middle of an onset, the algorithm has to cut the audio stream at an earlier adequate point. For that purpose it computes a smoothed envelope of the interested signal region and chooses the next minimum as the desired cut point.

Besides implementing the slicing function above, the approximation algorithm has to be modified, because the first version for single instrument sounds had difficulties with the extracted audio pieces. The reason is that the envelope criteria used for the detection of soa and eoa are not applicable for the audio pieces. Consider that the criteria have been derived with the help of audio files having the structure 'pause-sound-pause'. In consequence, the envelope's levels at the soa and eor points have been quite low in relation to the maximum sound level. But for the extracted audio pieces, the levels at the soa and eor points are much higher, because in polyphonic music there are almost no signal pauses between two adjacent onsets, at least if only one band is used for the whole frequency range. Therefore, the envelope criteria are extended with a correction term that considers the minimum envelope level of the audio piece.

From the derived A-D&S-R parameters, an extensive list of features which seemed to be promising for our classification tasks has been computed:

Group 1: Low level features per A-D&S-R phase (single band computation):
  time duration of phase ('t')
  level difference between start and end point of phase ('d')
  steepness of phase ('dit')

Group 2: Curve form description per A-D&S-R phase (single band computation):
  Curve form parameter n of phase
  An additional parameter that describes the error between approximation curve and real signal envelope: It is a parameter based on the autocorrelation function (ACF) of the error function in equation 2.3 of FIG. 5. The parameter is the height of the first peak beside the zero-lag point of the ACF. It describes the "strength" of the periodicity of the error function and is therefore called "error regularity".

Group 3: Features that describe the asynchrony of start and end points of the phases per band (multi band computation): Asynchrony has been defined as the deviation of the time instances soa, eoa, sor and eor in one band from their mean value over all bands (All filters of the filterbank are linear phase FIR filters having the same order, meaning that they all cause the same constant delay. Therefore the asynchrony measured here is in fact the asynchrony of the signal components). Over the so computed asynchrony values per band two scalar features are computed:
  mean of asynchrony over bands
  variance of asynchrony over bands Group 4: Mean values over bands of group 1 features, which were computed per band beforehand (multi band computation)

Group 5: Mean values over bands of group 2 features, which were computed per band beforehand (multi band computation)

Group 6: Variance values over bands of group 1 features, which were computed per band beforehand (multi band computation)

Group 7: Variance values over bands of group 2 features, which were computed per band beforehand (multi band computation)

Group 8: Features that describe the "shape" of group 1 feature values over all bands: Shape means the distribution of the per band feature values when they are plotted as a function of the auditory band. The shape is described by two parameters similar to the curve form parameter and the error regularity parameter mentioned above:
  One parameter that describes the approximation of the shape using a linear curve. The parameter is the gradient m of the linear approximation.
  One parameter describing the regularity of the error between shape and linear approximation. Its computation is similar to the error regularity parameter; it is based on an ACF between the linear approximation and the real shape.

Group 9: Shape parameters for group 2 features.

Instead of the previously described three-phase approximation, which can deal well with sounds that allow a clear distinction between D&S-Phase and R-Phase (e.g. Flute sound), a two-phase approximation can also be used. This approximation is advantageous for sounds which have only a decaying envelope, meaning that the D&S-Phase and the R-Phase can not be adequately separated (e.g. Drum sound). Therefore it is interesting to see, how the feature extraction would work if the D&S- and the R-Phase were combined into one phase. A combination would be rather simple: the resulting phase starts at the end of attack eoa and goes until the end of the release eor. Since this phase describes the rest of the signal after the A-Phase, this phase is called Attack-Residual-Phase (AR).

When applying this two-phase approximation, variations of the nine feature groups mentioned above are obtained. Now all features referring to the D&S- and R-Phase are exchanged with the corresponding features of the AR-Phase. In order to distinguish them from the original Three-phase approximation, these groups are denoted with an asterisk: "group 1*", "group 2*", etc. Note that the A-Phase related features in these new groups are the same as before and therefore they do not have to be computed again.

In addition, all multi band features have been computed using both approximations methods (group 3, groups 4 to 9, groups 4* to 9*) for three different numbers of bands: 4, 12 and 24. In order to indicate which number of bands belongs to the mentioned feature group, each group is denoted in the following way: "group X.1" for 4 bands, "group X.2" for 12 bands and "group X.3" for 24 bands.

In an embodiment of the method of the invention, a two-stage process is used in order to determine a genre and/or mood of the content item:

1. Extract sound events from an audio stream (step 21 of FIG. 2) and estimate their percussiveness using an adequately trained classifier (steps 23 and 25 of FIG. 2).

2. Compute secondary features (e.g. statistics) over these percussiveness estimations in the considered audio file (step 27 of FIG. 2) and use those secondary features for the final classification of the audio file (step 29 of FIG. 2).

For example, if one audio stream consists of about 80% percussive sounds, another one of about 30%, then the first one might be probably Latin music while the second one might be Classical music.

Note that this two-stage process is in fact a kind of hierarchical classification algorithm that consists of two classification stages: prediction of percussiveness and prediction of audio class. Of course the first step could be skipped and the percussiveness features could be used directly for classifying the audio class. But this would lead to an abstracted representation of the percussiveness of the extracted sounds events. Since percussiveness is intended as a tangible feature for audio classification, such an alternative one-step classification approach has been omitted.

The following table lists fourteen percussiveness predictors, i.e. classifiers that predict the percussiveness of the single extracted sounds:

| Predictor no. | Number of percussiveness classes | Features set |
| --- | --- | --- |
| 1 | 3 | Group 1 |
| 2 | | Group 2 |
| 3 | | Group 4.3 |
| 4 | | Group 5.3 |
| 5 | | Groups 1 & 2 |
| 6 | | Groups 4.3 & 5.3 |
| 7 | | Groups 1, 2, 4.3 & 5.3 |
| 8 | 2 | Group 1 |
| 9 | | Group 2 |
| 10 | | Group 4.3 |
| 11 | | Group 5.3 |
| 12 | | Groups 1 & 2 |
| 13 | | Groups 4.3 & 5.3 |
| 14 | | Groups 1, 2, 4.3 & 5.3 |

The fourteen predictors use different combinations of preselected feature sets and the two different ways of class labeling. Based on the percussiveness predictions per audio file, secondary features need to be computed for determining the final audio classification. The two-stage process of FIG. 2 can be implemented by the following steps:

1. Extract sound events from an approximately 6 seconds long piece of the audio file.
2. Predict the percussiveness of each extracted sound using the above mentioned predictors.
3. Compute the percentages per audio file how often the sounds are assigned to the different classes of percussiveness, e.g. 50% percussive and non-harmonic, 30% percussive and harmonic, 20% non-percussive.
4. Use two out of the three percentages as secondary features since the third follows from a linear combination of the selected two (feature1+feature2+feature3=1, holds always).

Experiments have shown these secondary features can be used to determine a genre of a content item with good results if one of the following approaches is used:

1. Detect One Music Genre Out of the Other.

That means the audio files of one music genre are assigned to class 1, while the audio files of the remaining 13 genres a assigned to class 2. This can be repeated for all 14 genres considered in these experiments.

2. Discriminate Between Two Music Genres.

That means that two music genres are classified, while the other audio files are excluded. This can be repeated for all music genre combinations.

The following table shows the accuracy of detecting one music genre out of the others:

| Music genre | Best predictor | Average performance |
| --- | --- | --- |
| Classical | 11 | 86.00 ± 6.17% |
| Jazz | 11 | 68.86 ± 8.28% |
| Pop | 8 | 65.23 ± 6.87% |
| Country | 3 | 63.24 ± 13.83% |
| Folk | 13 | 65.75 ± 10.32% |
| New age | 6 | 77.29 ± 12.07% |
| Electronica | 13 | 70.73 ± 8.69% |
| Latin | 12 | 71.86 ± 10.95% |
| R&B | 6 | 74.44 ± 7.94% |
| Rock | 3 | 64.72 ± 9.97% |
| Rap | 7 | 77.76 ± 8.85% |
| Reggae | 3 | 79.81 ± 9.78% |
| Vocal | 8 | 84.29 ± 8.34% |
| Easy Listening | 8 | 74.18 ± 13.48% |

This table indicates that Classical and Vocal music can be detected with about 85% accuracy, followed by Reggae music with almost 80%. In contrast Pop, Country, Folk and Rock music can not be reasonably detected with the described percussiveness algorithm, because their accuracy with 60-65% is slightly above chance.

Figures 5, 6:
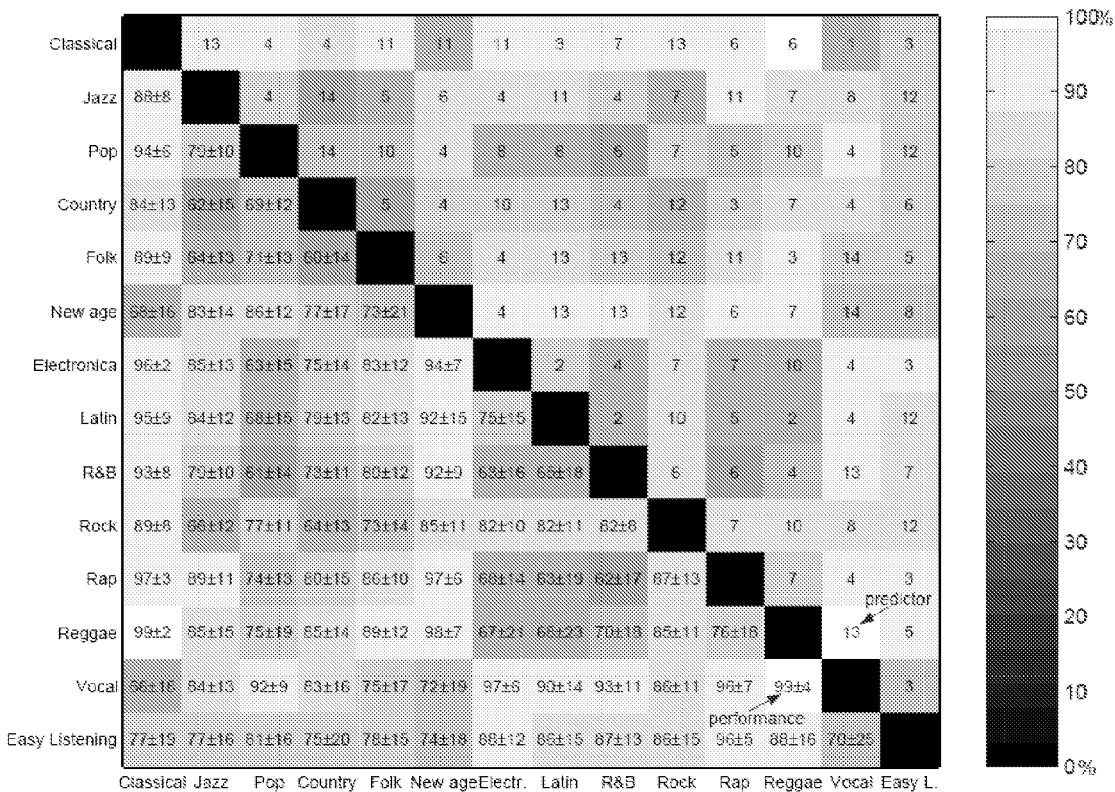
FIG. 5 shows equations used in the embodiment of FIG. 2.
FIG. 6 shows results of discriminating between two genres.

FIG. 6 shows a matrix with the discrimination performance. The numbers depicted in the fields below the main diagonal are the average discrimination accuracy of each class pair, while the numbers above the main diagonal denote the best predictor for each class pair. The achieved discrimination accuracies differ quite a lot. For some music genre combinations almost no discrimination is possible (60%), for instance Classical vs. New Age or Vocal, Rap vs. Electronica, Latin or R&B. But for other class pairs very good results are achieved (90-99%), for instance Classical or New Age vs. Rap, Reggae or Electronica.

Since music genres like Classical or Vocal usually consist of only a few percussive sounds, while genres like Rap or Electronica are very rhythmic oriented (a lot of percussive instruments), the detection and discrimination results are reasonable. In consequence the described percussiveness algorithm is capable of detecting and differentiating between at least some music genres. In order to keep clearness and visibility, only the results of the best performing predictor in each case are listed/shown.

Figure 7:
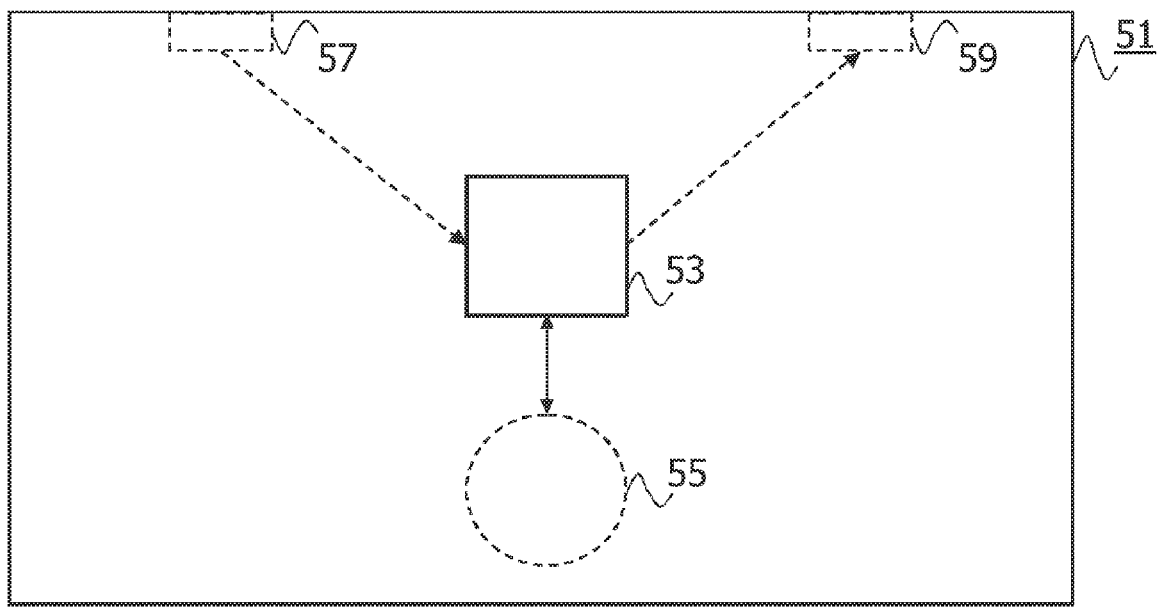
FIG. 7 is a block diagram of the electronic device of the invention.

Referring to FIG. 7, the electronic device 51 of the invention comprises electronic circuitry 53. The electronic circuitry 53 may be operative to select data representative of a plurality of sounds from the content item, determine a characteristic of each of the plurality of sounds by analyzing said data, each characteristic representing a temporal aspect of an amplitude of one of the plurality of sounds, and determine the characteristic of the content item based on the plurality of determined characteristics.

Additionally or alternatively, the electronic circuitry 53 may be operative to search for a content item in a plurality of content items, each content item in the plurality of content items being associated with an attribute value and a found content item being associated with an attribute value that is similar to a desired attribute value. The attribute value of said each content item is a characteristic of said each content item or is based on a characteristic of said each content item. Said characteristic of said each content item has been determined by selecting data representative of a plurality of sounds from the content item, determining a characteristic of each of the plurality of sounds by analyzing said data, each characteristic representing a temporal aspect of an amplitude of one of the plurality of sounds, and determining the characteristic of the content item based on the plurality of determined characteristics.

Although it is possible to analyze the plurality of content items after a search query has been received, a search can be performed faster by ensuring that the characteristic has been determined before the search query is received. This is convenient if the search is performed in a personal collection, as well as if the search is performed in a service provider (e.g. on-line store) collection. A first service provider, offering a service which allows a user to search a plurality of content items, may request a second service provider (or a content provider) to determine the characteristic for content items.

The electronic device 51 may be a server PC, a home PC, a media server, an audio/video (e.g. hard disk-based) recorder or a portable media player. The electronic circuitry 53 may be a general-purpose processor (e.g. Intel Pentium or AMD Athlon) or an application-specific processor (e.g. a Philips Nexperia IC). The electronic device 51 may further comprise a storage means 55, an input 57 and an output 57. The storage means 55 may comprise, for example, volatile or non-volatile RAM, a hard disk, an optical disk and/or a holographic storage medium. The content item of which the characteristic is determined and/or the determined characteristic of the content item itself may be stored on the storage means 55. The input 57 may be an optical or electrical (digital or analog) input, possibly for receiving video as well as audio. The output 57 may be an optical or electrical (digital or analog) output, possibly for transmitting video as well as audio. The output 57 may also be a reproduction means for reproducing a selected content item. The input 57 and/or the output 59 may comprise one or more network adapters connected to a home network and/or to the Internet. For example, the output 59 of a server PC may be used to transfer a song (e.g. MP3 file) to the input 57 of a consumer electronic device, e.g. home PC.

While the invention has been described in connection with preferred embodiments, it will be understood that modifications thereof within the principles outlined above will be evident to those skilled in the art, and thus the invention is not limited to the preferred embodiments but is intended to encompass such modifications. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

'Means', as will be apparent to a person skilled in the art, are meant to include any hardware (such as separate or integrated circuits or electronic elements) or software (such as programs or parts of programs) which perform in operation or are designed to perform a specified function, be it solely or in conjunction with other functions, be it in isolation or in co-operation with other elements. The invention can be implemented by means of hardware comprising several distinct elements, and by means of a suitably programmed computer. 'Software' is to be understood to mean any software product stored on a computer-readable medium, such as a floppy disk, downloadable via a network, such as the Internet, or marketable in any other manner.

The invention claimed is:

1. A method of determining a percussiveness measure of a content item, comprising the steps of:
   selecting (1) data representative of a plurality of sounds from the content item;
   determining (3) a characteristic of each of the plurality of sounds by analyzing said data without determining a source type of the sounds, each characteristic representing an aspect of temporal envelope of one of the plurality of sounds; and
   determining (5) the percussiveness measure of the content item based on the plurality of determined characteristics.

2. A method as claimed in claim 1, wherein the step of determining (5) the percussiveness measure of the content item comprises determining a percentage.

3. A method as claimed in claim 1, wherein the step of determining (5) the percussiveness measure of the content item comprises determining a dominant instrument.

4. A method as claimed in claim 1, further comprising the step of determining (7) a classification category of the content item based on the percussiveness measure of the content item, the classification category selected from the group consisting of genre, mood, and combinations thereof.

5. A method as claimed in claim 4, wherein the step of determining (5) the percussiveness measure of the content item comprises determining a first characteristic and a second characteristic of the content item and the step of determining (7) a classification category of the content item comprises comparing the first characteristic with a characteristic of a first classification category and comparing a second characteristic with a characteristic of a second classification category.

6. A method as claimed in claim 1, wherein the step of determining (3) a characteristic of each of the plurality of sounds comprises determining a characteristic of a first phase (A) of each of the plurality of sounds and a characteristic of a second phase (D&S, R) of each of the plurality of sounds.

7. A method of searching for a content item in a plurality of content items, each content item in the plurality of content items being associated with an attribute value, a found content item being associated with an attribute value that is similar to a desired attribute value, the attribute value of said each content item being a percussiveness measure of said each content item or being based on a percussiveness measure of said each content item, and said percussiveness measure of said each content item having been determined by:
   selecting data representative of a plurality of sounds from the content item;
   determining a characteristic of each of the plurality of sounds by analyzing said data without determining a source type of the sounds, each characteristic representing an aspect of temporal envelope of one of the plurality of sounds; and
   determining the percussiveness measure of the content item based on the plurality of determined characteristics.

8. A computer program product, comprising a computer usable medium having a computer readable program code embodied therein, said computer readable program code adapted to be executed to implement the method of claim 1.

9. An electronic device (51) comprising electronic circuitry (53), the electronic circuitry (53) being operative to:
   select data representative of a plurality of sounds from a content item;
   determine a characteristic of each of the plurality of sounds by analyzing said data without determining a source type of the sounds, such as a music instrument, each characteristic representing an aspect of the temporal envelope of one of the plurality of sounds; and
   determine a measure of percussiveness of the content item based on the plurality of determined characteristics.

10. An electronic device (51) comprising electronic circuitry (53), the electronic circuitry (53) being operative to:

search for a content item in a plurality of content items, each content item in the plurality of content items being associated with an attribute value, a found content item being associated with an attribute value that is similar to a desired attribute value, the attribute value of said each content item being a percussiveness measure of said each content item or being based on a percussiveness measure of said each content item, and said percussiveness of said each content item having been determined by:

selecting data representative of a plurality of sounds from the content item;

determining a characteristic of each of the plurality of sounds by analyzing said data without determining a source type of the sounds, each characteristic representing an aspect of temporal envelope of one of the plurality of sounds; and determining the percussiveness measure of the content item based on the plurality of determined characteristics.

\* \* \* \* \*